Figure 1:
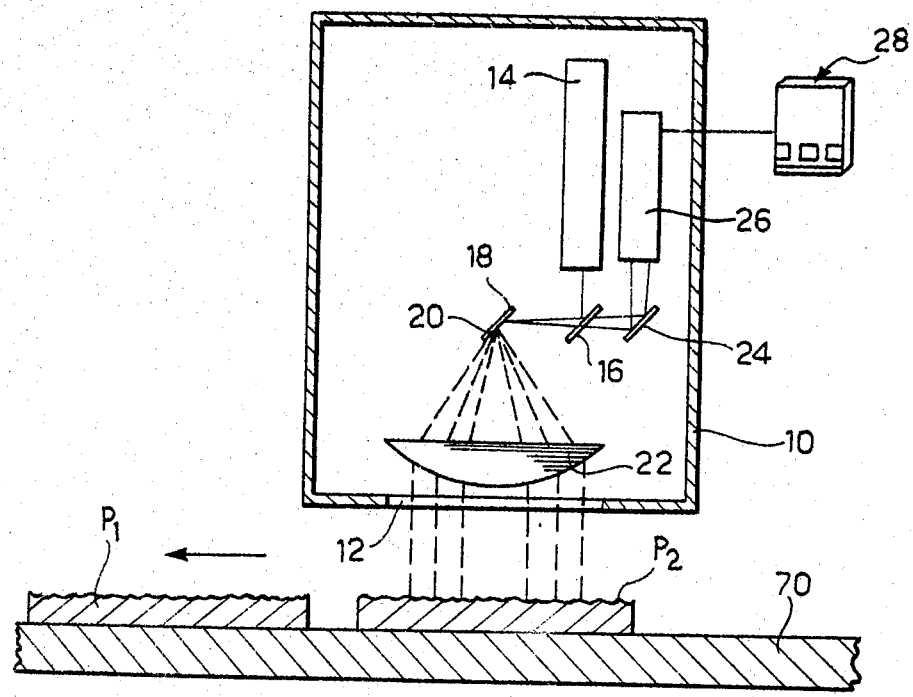

United States Patent [19]

Milana

[11] 4,290,698
[45] Sep. 22, 1981

[54] APPARATUS FOR TESTING SURFACE ROUGHNESS

[75] Inventor: Emilio Milana, Rivalta, Italy

[73] Assignee: Centro Ricerche Fiat S.p.A., Orbassano, Italy

[21] Appl. No.: 69,135

[22] Filed: Aug. 23, 1979

[30] Foreign Application Priority Data

Oct. 24, 1978 [IT] Italy .................. 69438 A/78

[51] Int. Cl.³ ............... G01B 11/30; G01N 21/55
[52] U.S. Cl. ........................ 356/371; 356/394; 356/448
[58] Field of Search ........... 356/371, 394, 445, 448, 356/237

[56] References Cited

U.S. PATENT DOCUMENTS

| 3,909,602 | 9/1975 | Micka | 356/237 |
| 3,972,617 | 8/1976 | Shibato et al. | 356/319 |
| 3,977,789 | 8/1976 | Hunter et al. | 356/371 |

Primary Examiner—Vincent P. McGraw
Attorney, Agent, or Firm—Sughrue, Mion, Zinn, Macpeak & Seas

[57] ABSTRACT

Surface roughness is tested by an optical probing method which involves scanning a beam of light from a laser over a specimen workpiece via a semi-reflecting mirror and a cylindrical lens and detecting the specular component of the light reflected back through the lens and the semi-reflecting mirror to a photomultiplier the output from which is fed to an electronic processor circuit which derive a numerical value representing the mean intensity of the reflected radiation. A workpiece to be tested is then substituted for the specimen workpiece and a new numerical value derived. The two numerical values are compared, as by division or subtraction to obtain an output signal representing the relative surface roughness of the workpiece under test with respect to that of the specimen.

6 Claims, 2 Drawing Figures

APPARATUS FOR TESTING SURFACE ROUGHNESS

The present invention relates to a process for testing the surface roughness of a workpiece which has been subjected to a mechanical working operation, such as turning, grinding, lapping, polishing and the like. In particular the present invention relates to a process which allows a rapid and precise indication of the mean relative degree of roughness of workpieces tested to be obtained without requiring direct physical contact with the workpieces themselves, and which therefore permits the quality of the surface finish of the workpieces to be tested directly on the production lines.

Accordingly, the present invention provides a method of testing the surface roughness of a workpiece which has been subjected to a mechanical working operation, comprising the steps of: directing onto the surface of a specimen workpiece a coherent monochromatic beam of radiation, causing relative displacement between the specimen workpiece and the beam of radiation in such a way as to cause the beam to scan the region of interest of the surface of the specimen workpiece, directing the specular component of the radiation reflected from each point of the scanned region of the said surface to a photomultiplier operable to provide at its output an electrical signal indicative of the intensity of the radiation incident thereon, deriving from the electrical signal provided by the said photomulitplier a numerical value corresponding to the mean level of this signal and storing this numerical value, directing onto the surface of a workpiece under test a coherent monochromatic beam of radiation, causing relative displacement between the workpiece under test and the beam of radiation to cause the beam to scan the region of interest of the surface of the said workpiece under test, directing the specular component of the reflected radiation from each point of the scanned region of the said surface to a photomultiplier operable to provide at its output an electrical signal indicative of the intensity of the radiation incident thereon, deriving from the electrical signal provided from the said photomultiplier a numerical value corresponding to the mean level of this signal and storing this numerical value, and comparing the two said stored numerical values to derive an indication of the degree of roughness of the surface of the workpiece under test with respect to that of the specimen workpiece.

The above defined method is highly discriminatory, that is to say it is able to distinguish different states of roughness, particularly at low values of roughness, that is lower than about 1.6 micron. This method can therefore be used with advantage for testing the surface roughness of finished and superfinished flat or cylindrical surfaces, for example workpieces subjected to a working operation such as turning, grinding or lapping. Examples of workpieces for which the method of the present invention may be used for testing are, the cylinders of internal combustion engines, gudgeon pins for pistons, metal mirrors and the like.

In another aspect the present invention provides apparatus for testing the surface roughness of a workpiece which has been subjected to a mechanical working operation, comprising a support for the workpiece to be tested, a laser radiation source, a first optical system for directing onto the surface of a workpiece to be tested, mounted on the said support, the beam of radiation emitted by the said radiation source, means for relatively displacing the said support and the said beam of radiation in such a way as to scan the radiation over the region of interest of the surface of the workpiece under test, a second optical system for directing the specular component of the radiation reflected from each point of the scanned region of the said surface to a photomultiplier in such a way as to obtain, at the output of the photomultiplier, an electrical signal indicative of the intensity of such component, and an electronic processor circuit fed with the output signal from the said photomultiplier, the said processor circuit being operable to derive a numerical value corresponding to the mean level of the said output signal and to provide a numerical indication of the ratio or the difference between the said numerical value and a reference numerical value.

Apparatus made according to the present invention is particularly reliable, precise and easy to use; moreover it does not require special zeroing or calibration operations for each use, and it allows testing of the surface roughness of workpieces to be undertaken at a distance from the workpieces without requiring physical contact with them. It can therefore be used directly along the mechanical production lines on which the workpieces are being made, in order to test the quality of the surface finish of the workpieces during production.

Figure 2:
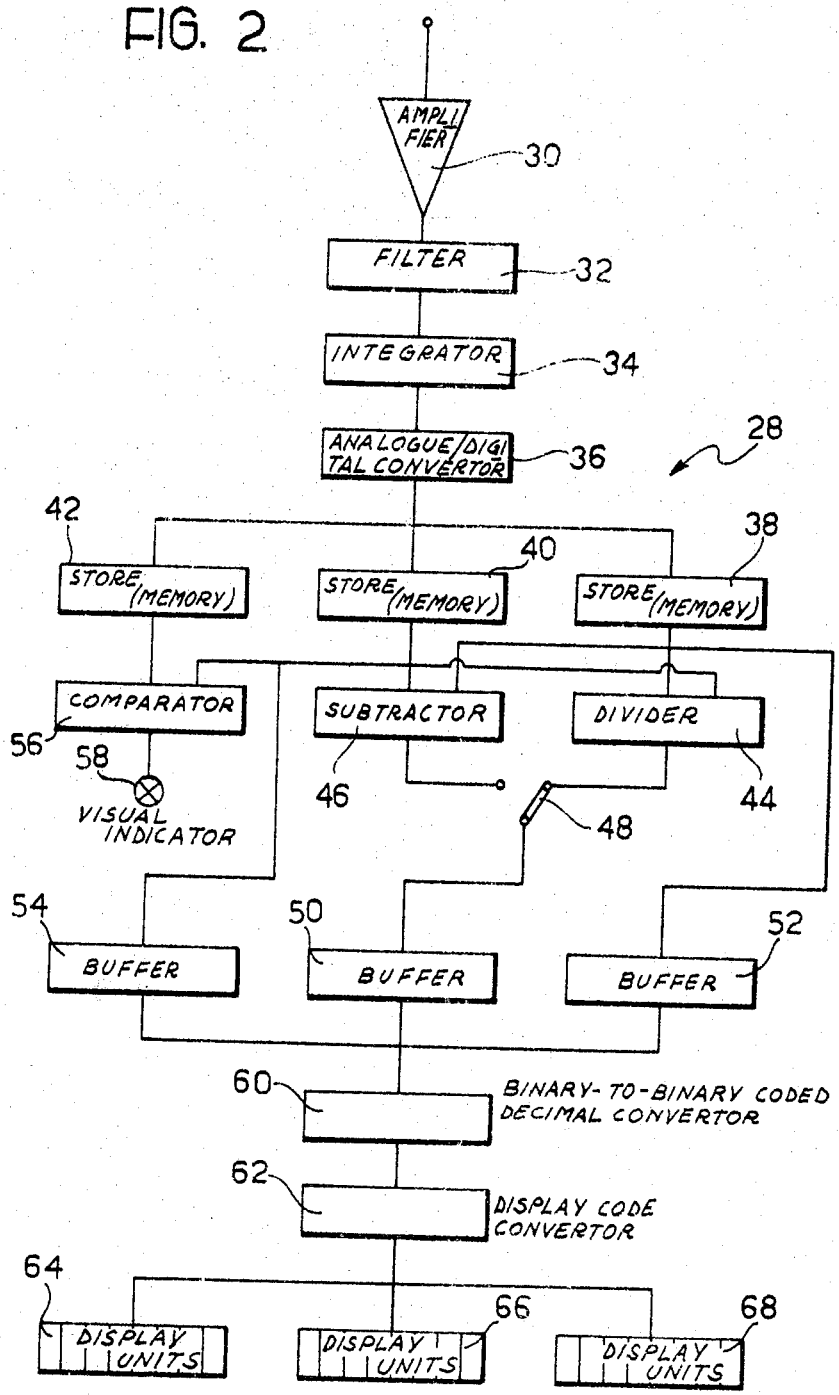

One embodiment of the present invention will now be more particularly described, by way of example, with reference to the accompanying drawings, in which:

FIG. 1 is a schematic side view, partially in section, of apparatus formed as an embodiment of the invention; and FIG. 2 is a block schematic diagram of the electronic processor circuit of the apparatus illustrated in FIG. 1.

With reference first to FIG. 1 of the drawings, there is shown a closed support and protection casing 10 provided with a transparent portion 12 in its bottom wall. Within the casing 10 is housed a laser 14, of a known type, operable to produce a coherent, monochromatic beam of light. Light from the laser 14 falls on a semi-transparent mirror 16 also housed within the casing 10 at a short distance from the output end of the laser 14 and positioned to deflect through 90° the radiation incident on it from the laser 14.

Light from the laser 14 deflected by the semi-transparent mirro 16 is incident on a first mirror 18 aligned with the semi-transparent mirror 16 and pivoted centrally about a horizontal axis 20. It should be made clear at this stage that the term "light" is used to indicate not only electro-magnetic radiation having a wavelength in the visible spectrum but also electro-magnetic radiation having a wavelength falling outside this range. The pivoted first mirror 18 deflects the light incident thereon towards a cylindrical lens 22, located in a position underlying the pivoted first mirror 18 and facing the transparent portion 12 of the casing 10; the focus of the lens 22 is situated substantially at the point on the pivoted mirro 18 at which, in use, the radiation reflected by the semi-transparent mirror 16 is incident.

The pivoted mirror 18 can be made to oscillate about the axis 20, for example by means of a moving coil instrument (not illustrated) fed with a triangular electrical signal, in such a way as to direct the radiation coming from the semi-transparent mirror 16 to scan the entire facing surface of the cylindrical lens 22.

A second mirror 24, aligned with and parallel to the semi-transparent mirror 16 is located on the side thereof opposite the pivoted first mirror 18. The second mirror 24 is situated in a position underlying the input of a photomultiplier 26, which may be of a type known per se, and which is supported within the casing 10 in a position alongside the laser radiation source 14.

The output of the photomultiplier 26 is connected to an electronic processor circuit 28 situated outside the casing 10.

The electronic processor circuit 28, which is illustrated in detail in FIG. 2, includes an amplifier 30 fed from the output of the photomultiplier 26 and the output of which is connected, through a low-pass filter 32, to an integrator 34, and from there to an analogue-to-digital convertor 36 the output from which leads to a first, a second and a thrid memory circuit, 38, 40 and 42 respectively.

The outputs of two of the memory circuits, that is memories 38 and 40, lead to a divider circuit 44 and to a subtractor circuit 46 the outputs of which are connected, via a switch 48, to a first buffer 50.

The output of the first memory circuit 38 is also connected to a second buffer 52, whilst the output of the second memory circuit 40 is connected both to the input of a third buffer 54 and to an input of a comparator 56.

The other input of the comparator 56 is connected to the output of the third memory circuit 42, and the output of this comparator 56 leads to an illuminated indicator 58.

The outputs of the three buffer circuits 50, 52 and 54 all lead, through a convertor 60 for the conversion of the binary signals into binary coded decimal signals and, through a decoder circuit 62 for the conversion to the code normally used for display, to three display units 64, 66 and 68.

The device described above permits the surface roughness of workpieces subjected to mechanical working, particularly surface worked by turning, shaping, grinding and lapping to be tested.

The operation of the device described above is as follows:

First, a specimen workpiece, indicated $P_1$, of material indentical to that of the workpieces to be tested, is positioned on a support 70. Then the support casing 10 containing the laser radiation source 14, the semi-transparent mirror 16, the mirrors 18 and 24, the cylindrical lens 22 and the photomultiplier 26 is located in a position over the support 70 in such a way that the optical axis of the cylindrical lens 22 is perpendicular to the surface of the specimen workpiece $P_1$. Subsequently, the laser radiation source 14 is fed in such a way as to produce a beam of monochromatic coherent light directed towards the semi-transparent mirror 16. Contemporaneously, the mirror 18 is put into oscillation about the axis 20 with a frequency in the region of 50 Hz in such a way as to cause the radiation reflected from the semi-transparent mirror 16 to perform an angular scanning of predetermined amplitude on the surface of the cylindrical lens 22. This latter permits the radiation which has passed through the lens 22 to be incident onto the entire surface of the specimen workpiece $P_1$ in a direction normal to such surface.

The radiation reflected from the surface of the workpiece $P_1$ will have a diffuse component and a specular component the relative magnitudes of which will depend on the nature of the surface. The specular component of the laser radiation reflected from each point of the investigated surface of the specimen workpiece $P_1$ is returned through the lens 22 to the mirror 18 where it is reflected through the semi-transparent mirror 16 to the mirror 24 which reflects it to the input of the photomultiplier 26.

The photomultiplier 26 thus provides at its output an electrical signal indicative of the intensity of this specular component of the reflected radiation, which is fed to the electronic processor circuit 28. The processor circuit 28 receives the signal coming from the photomultiplier 26, amplifies it in the amplifier 30, filters it in the low-pass filter 32 and derives from it the mean value via the integrator 34. This mean value signal is converted into digital signals in the analogue-to-digital convertor 36 and memorised by the first memory circuit 38.

Next, the specimen workpiece $P_1$ is replaced with a workpiece $P_2$ to be tested, and the previously described operations are repeated so as to obtain at the output of the photomultiplier 26 an electrical signal indicative of the intensity of the specular component of the reflected radiation from each point of the investigated region of the surface of the workpiece $P_2$ under test. This signal is fed to the processor circuit 28 which again amplifies and filters it, and derives from it the mean value as described above. The means value signal is converted into digital form and passed to the second memory circuit 40 to be stored.

The numerical value memorised by the circuit 38 is passed both to the divider 44 and to the subtractor 46 and, through the buffer 52, to the binary-to-b.c.d. convertor 60, and from there to the decoder 62 which feeds the display unit 64. In a like manner the numerical value memorised by the circuit 40 is fed both to the divider 44 and the subtractor 46 and, this time through the buffer 54, to the binary-to-b.c.d. convertor 60 and the decoder 62 which feeds it to the display unit 66.

Within the divider 44 the numerical value memorised by the circuit 40, relating to the investigation of the workpiece $P_2$ under test, is divided by the numerical value memorised by the circuit 38 and relating to the investigation of the surface of the specimen workpiece $P_1$. Correspondingly, in the subtractor 46 the numerical value memorised by the circuit 40 is subtracted from the numerical value memorised by the circuit 38.

The switch 48 acts selectively to direct the numerical value at the output of the divider 44 or the numerical value at the output of the subtractor 46 to the buffer 50, and thus through the convertor 60 and the decoder 62 to the display unit 68. The numerical value displayed by the display unit 68 thus represents a parameter correlated to the value of the mean roughness of the surface of the workpiece $P_2$ under test.

The apparatus described above has an excellent discriminating capacity, that is to say a capacity to distinguish different states of roughness of the workpieces to be tested, particularly for low values of roughness, that is lower than about 1.6 micron. This apparatus is therefore of great advantage for determining the surface roughness of very smooth surfaces, such as those obtained by means of grinding or lapping.

The apparatus of the present invention can also provide a visual indication in the event that the value of the mean roughness of the surface of a workpiece being tested is greater than a pre-established threshold value. To obtain this indication it is necessary to locate on the support 70 a second specimen workpiece, not illustrated in the drawings, the value of the surface roughness of which corresponds to a limit value of acceptability, and to subject this second specimen workpiece to the operations previously described with reference to the specimen workpiece $P_1$ prior to investigating the surface of the workpiece $P_2$ under test. At the end of this operation the signal at the output of the photomultiplier 26, indicative of the intensity of the specular component of the radiation reflected from each point of the investigated region of the surface of the second specimen workpiece, is passed to the processor circuit 28. The circuit 28, as previously described, provides for amplification and filtering of the signal, and then derives the mean value of the amplified and filtered signal. This mean value is converted to binary code by the convertor 36 and passed to the third memory circuit 42 where it is stored. After the surface of the workpiece $P_2$ under test has been investigated, the numerical value memorised by the memory circuits 40 and 42 are fed to the inputs of the comparator 46. In the event that the numerical value corresponding to the investigation of the workpiece $P_2$ under test is greater than the numerical value relating to the investigation of the second specimen workpiece, the comparator 46 produces an output signal to illuminate the indicator 58.

From the above description it will be apparent that the device according to the invention is reliable, precise and easy to use and can therefore be used to effect testing of the surface quality of workpieces subjected to mechanical working whilst these are still in production. Although an embodiment arranged particularly to test workpieces having flat surfaces has been described, it will be apparent to those skilled in the art that with suitable modifications the apparatus can be used to test workpieces having curved surfaces. Likewise, although appartus for detecting the specular component of reflected radiation normal to the surface has been described, it will be apparent that specular reflection at a predetermined angle can be detected by positioning appropriate optical components at equal angles of incidence and reflection.

What is claimed is:

1. Apparatus for testing the surface roughness of a workpiece which has been subjected to a mechanical working operation, comprising in combination,
    a support for the workpiece to be tested,
    a laser radiation source,
    a first optical system positioned in the path of radiation from said radiation source and operating to direct the beam of radiation emitted by said source onto the surface of a workpiece to be tested mounted on said support,
    means for relatively displacing said support and said beam of radiation whereby to scan said beam of radiation over the region of interest of said surface of said workpiece under test,
    a photomultiplier,
    a second optical system positioned in the path of the specular component of radiation reflected from each point of said scanned region of said surface of said workpiece under test and operating to direct said specular component of the reflected radiation to said photomultiplier whereby to obtain at the output of said photomultiplier an electrical signal indicative of the intensity of said component,
    an electronic processor cirecuit connected to the output from said photomultiplier, said processor circuit operating to derive a numerical value corresponding to the mean level of said output signal and to provide a numerical indication of at least one of the ratio and the difference between said numerical value and a reference numerical value,
    said first and second optical systems together comprise:
    a semi-transparent mirror positioned to deflect by 90° radiation incident thereon from said laser radiation source,
    a cylindrical lens,
    a first reflector positioned in the path of radiation reflected from said semi-transparent mirror so as to deflect it to said cylindrical lens, said cylindrical lens having its focal line passing through the point on said first reflector at which incident radiation from said semi-transparent mirror impinges and having its optical axis normal to the surface of said workpiece to be tested,
    a second reflector positioned to deflect towards said photomultiplier the specular component of reflected radiation from each point of the scanned zone of the said surface, which arrives at said second reflector after having passed through said cylindrical lens, and said means for relatively displacing said support and said beam of radiation comprise means for causing said first reflector to oscillate about an axis parallel to the surface of said workpiece to be tested and passing through the focus of said cylindrical lens.

2. The apparatus of claim 1, wherein said first optical system includes means for displacing said beam of radiation along the surface of said workpiece to be tested.

3. Apparatus for testing the surface roughness of a workpiece which has been subjected to a mechanical working operation, comprising in combination,
    a support for the workpiece to be tested,
    a laser radiation source,
    a first optical system positioned in the path of radiation from said radiation source and operating to direct the beam of radiation emitted by said source onto the surface of a workpiece to be tested mounted on said support,
    means for relatively displacing said support and said beam of radiation whereby to scan said beam of radiation over the region of interest of said surface of said workpiece under test,
    a photomultiplier,
    a second optical system positioned in the path of the specular component of radiation reflected from each point of said scanned region of said surface of said workpiece under test and operating to direct said specular component of the reflected radiation to said photomultiplier whereby to obtain at the output of said photomultiplier an electrical signal indicative of the intensity of said component,
    an electronic processor circuit connected to the output from said photomultiplier, said processor circuit operating to derive a numerical value corresponding to the mean level of said output signal and to provide a numerical indication of at least one of the ratio and the difference between said numerical value and a reference numerical value,
    said electronic processor circuit comprises:
    amplifier means connected to the output from said photomultiplier,
    filtering means connected to the output of said amplifier means,
    integrator means connected to the output of said filtering means for deriving the mean value of the amplified and filtered signal,
    an analogue-to-digital converter connected to the output of said integrator means for producing a numerical value representing said mean signal value, first memory means operating to store the mean numerical value of a signal derived from the investigation of the surface of a specimen workpiece, second memory means operating to store the mean numerical value of a signal derived from the investigation of the surface of said workpiece to be tested, divider means operating to divide said numerical value stored in said second memory means by said numerical value stored in said first memory means, subtractor means operating to subtract said numerical value stored in said second memory means from said numerical value stored in said first memory means, switching means for selectively connecting one of said divider means and said subtractor means to said first and second memory means, and visiual display means producing a visual display of the output signal from one of said divider and said subtractor according to the position of said switching means.

4. The apparatus of claim 3, wherein there is further provided:

third memory means operating to store the mean numerical value of the signal derived from the investigation of the surface of a second specimen workpiece, comparator means connected to the outputs of said second and said third memory means and operating to provide an output signal when the value at the output of said second memory means is greater than the value at the output of said third memory means.

5. The apparatus of claim 4, wherein the output signal from the said comparator is fed to a further visual display device.

6. The apparatus of claim 3, wherein said first optical system includes means for displacing said beam of radiation along the surface of said workpiece to be tested.

* * * * *